C. T. PENTON.
FLEXIBLE MOUNTING FOR TRACTOR FRAMES.
APPLICATION FILED MAR. 5, 1921.
1,425,687.
Patented Aug. 15, 1922.
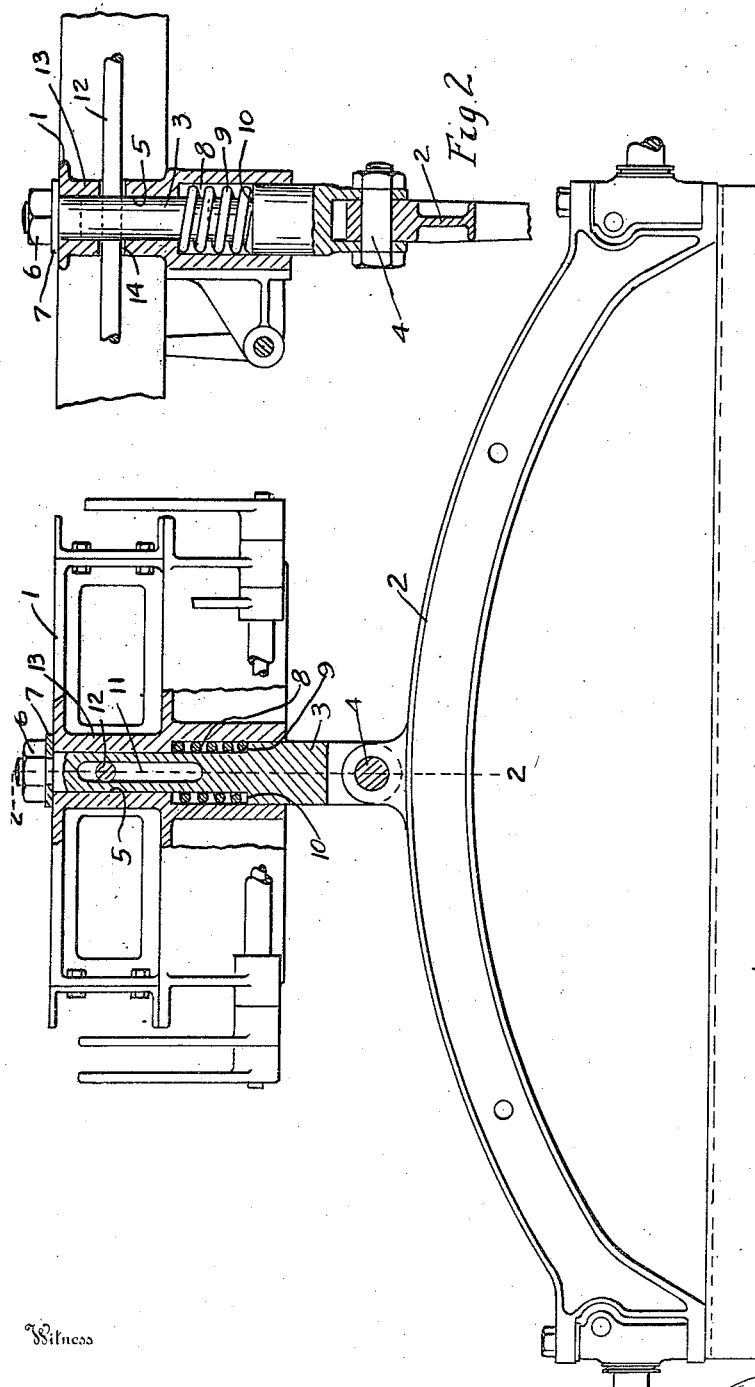
Inventor
Carl T. Penton.

UNITED STATES PATENT OFFICE.

CARL T. PENTON, OF DETROIT, MICHIGAN.

FLEXIBLE MOUNTING FOR TRACTOR FRAMES.

1,425,687.  Specification of Letters Patent.  Patented Aug. 15, 1922.

Application filed March 5, 1921. Serial No. 449,699.

*To all whom it may concern:*

Be it known that I, CARL T. PENTON, a citizen of the United States, residing at Detroit, in the county of Wayne and State of Michigan, have invented a new and useful Flexible Mounting for Tractor Frames, of which the following is a specification.

This invention relates to tractors and more particularly to means for flexibly mounting the frame of a tractor upon an axle thereof.

It is the object of the invention to provide for pivotally mounting the frame of a tractor upon an axle of the vehicle so as to permit said axle to assume such inclinations as may result from an uneven condition of the ground over which the vehicle is traveling without subjecting the frame to a similar inclination, and the invention further contemplates the association with such a mounting of cushioning means to absorb shocks and vibrations imparted thereto.

In attaining these objects the invention contemplates forming a vertical bore in the tractor frame and slidably engaging in said bore a pin pivoted at its lower end transversely upon the axle, a spring being arranged within said bore between shoulders upon the pin and frame so as to resiliently support the latter upon the former, whereby the axle may tilt without a corresponding angular movement of the frame and without binding said pin against free vertical movement in said bore.

A preferred embodiment of the invention is hereinafter described and is illustrated in the accompanying drawing, wherein, Fig. 1 is an end view of a tractor chassis, showing sectionally the means for mounting the frame on the axle.

Fig. 2 is a vertical sectional view of the flexible mounting, the section being taken on line 2—2 of Fig. 1.

In these views the reference character 1 designates a cross piece at or near an end of a tractor frame, and 2 is an axle upon which said end of the frame is mounted. As shown, said axle has the form of an arch with a bar 2' extended between and secured to its extremities. The means for mounting the frame comprises a pin 3 having its lower end pivoted as indicated at 4 upon the axle, and slidably engaging in a vertical bore 5 in the frame member 1, said pin having a threaded extremity projecting above the frame and engaged by a nut 6 and washer 7, maintaining the described assembly. The lower portion of the bore 5 is counterbored as indicated at 8 to accommodate a coiled spring 9 abutting terminally against the top of the counterbore and against an annular shoulder 10 formed by enlarging the lower portion of said pin. Thus said spring yieldably transmits to the axle the weight of the overlying frame extremity and of the load thereupon. The upper portion of the pin 3 is vertically slotted as indicated at 11, and through said slot there is passed a shaft 12 which carries means (not shown) for cranking the engine. The vertical slide bearing 13 of the member 1, in which bearing said pin engages, is apertured as indicated at 14 to accommodate the shaft 12 but the apertures 14 need not have the nature of slots since said shaft must be mounted upon and move in unison with the frame.

In the use of the described construction, when the axle 2 is tilted, due to any unevenness or inclination of the surface over which the tractor is traveling, the frame 1 is not compelled to assume a corresponding inclination and may remain substantially level, since the pin 3 may swing upon its pivot 4 and thus remain vertical. Responsive to shocks or vibrations the frame 1 may rise and fall to a limited extent upon said pin, allowing the spring 9 to largely absorb the resulting stresses, and the freedom of this relative movement will be in no way restricted by tilting of the axle 2, owing to pivoting of the pin 3 upon said axle. The problem arising from necessity of locating the axis of the engine cranking shaft 12 in the vertical plane transversely and centrally intersecting the axle is solved by forming the pin 3 with the slot 11 to accommodate said shaft. Thus the shaft may participate in any up and down movement of the frame and is guided in such movement by said slot. The construction is advantageous in maintaining stable equilibrium of a tractor while traveling over a rough or hilly surface, and furthermore tends to safeguard the mechanism carried by the tractor frame against damage or deterioration as the result of shocks and vibration.

What I claim is:

In a tractor, the combination with the frame thereof and an axle supporting an end of the frame, of a vertically slotted pin slidably engaging the frame, and pivoted upon the axle transversely thereof, a spring embracing said pin yieldably transmitting the load of the frame to the axle, and a shaft mounted upon the frame and passing through the slot of said pin.

In testimony whereof I sign this specification.

CARL T. PENTON.